United States Patent
Roegelein et al.

(10) Patent No.: US 9,280,449 B2
(45) Date of Patent: Mar. 8, 2016

(54) HIT TESTING OF VISUAL OBJECTS

(75) Inventors: Ulrich Roegelein, Gaiberg (DE);
Juergen Gatter, Rauenberg (DE);
Martina Gozlinski, Frankenthal (DE);
Wolfgang Mueller, Wiesloch (DE);
Siegfried Peisl, Ketsch (DE); Ralf Rath,
Viernheim (DE); Uwe Reimitz, Wiesloch
(DE)

(73) Assignee: SAP SE, Walldorf (DE)

( * ) Notice: Subject to any disclaimer, the term of this patent is extended or adjusted under 35 U.S.C. 154(b) by 270 days.

(21) Appl. No.: 13/468,049

(22) Filed: May 10, 2012

(65) Prior Publication Data
US 2013/0300656 A1    Nov. 14, 2013

(51) Int. Cl.
*G06F 11/36* (2006.01)

(52) U.S. Cl.
CPC .................................. *G06F 11/3664* (2013.01)

(58) Field of Classification Search
CPC ......... G06T 15/06; G06T 15/00; G06F 3/033;
G06F 3/04883; G06F 11/3664
USPC ......... 345/173, 419, 622, 157, 611, 440, 522;
382/154
See application file for complete search history.

(56) References Cited

U.S. PATENT DOCUMENTS

| | | | | |
|---|---|---|---|---|
| 8,217,962 B2* | 7/2012 | Tong et al. | | 345/622 |
| 8,547,481 B2* | 10/2013 | Look et al. | | 348/558 |
| 2002/0163519 A1* | 11/2002 | Kitsutaka | | 345/440 |
| 2005/0243084 A1* | 11/2005 | Smith et al. | | 345/419 |
| 2006/0250414 A1* | 11/2006 | Golovin | | 345/611 |
| 2007/0252841 A1* | 11/2007 | Kim | | 345/522 |
| 2008/0192050 A1* | 8/2008 | Schardt et al. | | 345/421 |
| 2009/0217187 A1* | 8/2009 | Kendall | | G06T 3/00 715/765 |
| 2010/0188402 A1* | 7/2010 | Mejdrich et al. | | 345/426 |
| 2010/0193588 A1* | 8/2010 | Cherry | | 235/454 |

* cited by examiner

*Primary Examiner* — Phi Hoang
*Assistant Examiner* — Michael Le

(57) ABSTRACT

Various embodiments for hit testing of visual objects are described herein. Data of visual objects is generated in a two-dimensional clip space. The data of visual objects includes two-dimensional projections of the visual objects. Cursor coordinates are transformed into the clip space and bounding box calculations are performed using the transformed cursor coordinates and the generated data. Hit testing is performed when there is a hit on a bounding box of at least one of the visual objects in the clip space. The hit testing is performed in a three-dimensional space. A result is then presented on a user interface based on the hit testing.

17 Claims, 10 Drawing Sheets

HIT TESTING OF VISUAL OBJECTS

BACKGROUND

Several applications involve rendering of visual objects on a user interface. A rendering pipeline or method is typically used to render visual objects. The rendering pipeline includes a series of steps starting from an input to final rendering. These steps include, for example, transformations, rasterizing, clipping, etc., depending on the type of graphics pipeline. In addition to rendering, hit testing calculations are performed to recognize which object is selected by the user. Information about objects and cursor location is used for hit testing. Typically, a Graphics Processing Unit (GPU) performs the rendering and, in parallel, a Central Processing Unit (CPU) performs hit testing calculations. But if there are large number of visual objects, hit testing calculations consume significant CPU resources. This leads to performance issues such as reduced response time.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for hit testing of visual objects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
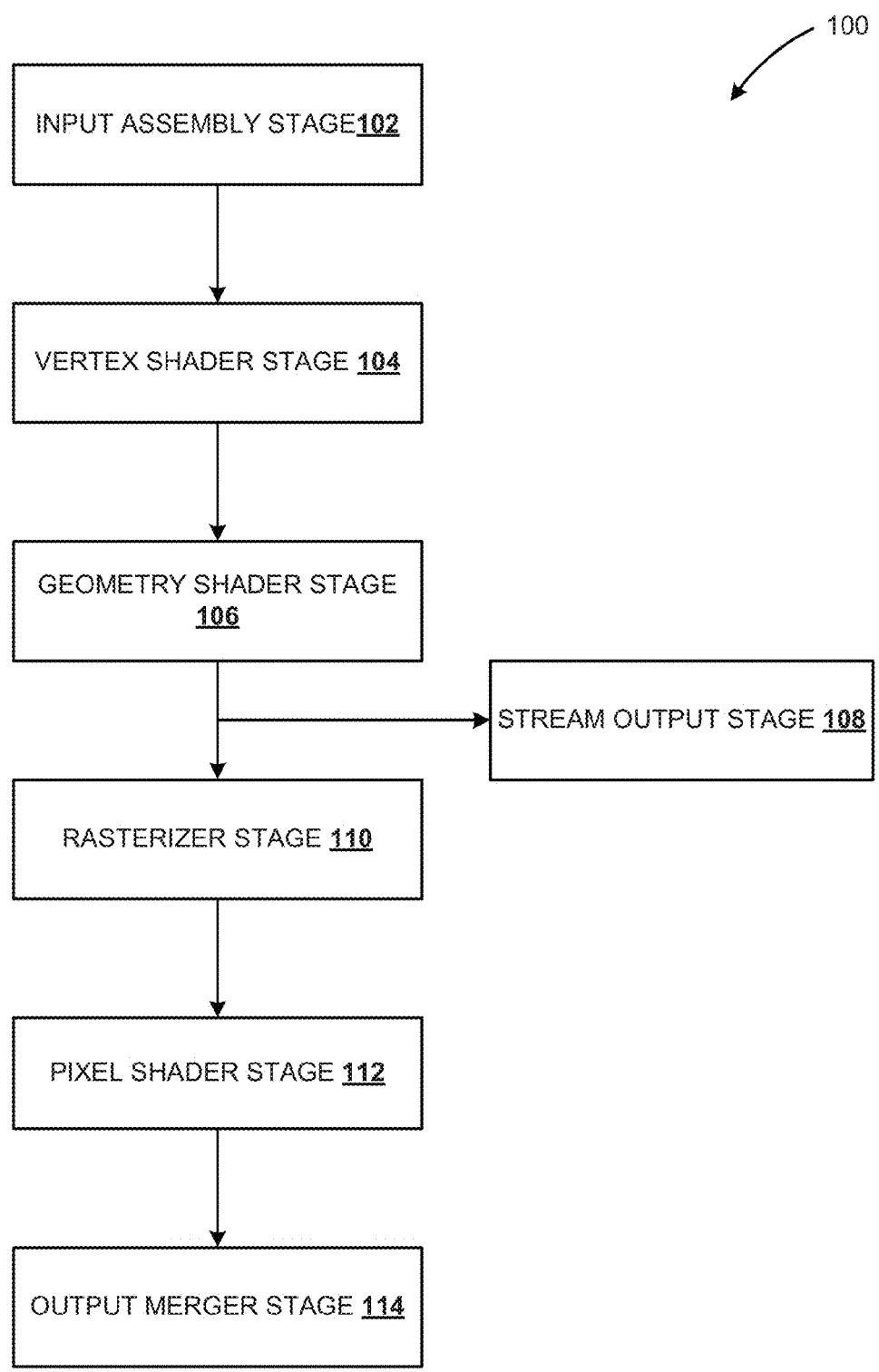
FIG. 1 is a block diagram illustrating an example of a graphics pipeline.

Graphics pipeline refers to a process for rendering images on a screen. A graphics pipeline includes several stages in the process of rendering images. FIG. 1 illustrates stages of a graphics pipeline 100, as an example. It should be noted that types and number of stages in a graphics pipeline can vary depending on the type of graphics rendering platform or graphic application programming interfaces (API). Also, graphics pipelines continue to evolve and there can be refinements and changes to the stages in the pipeline. Some or all the stages of the pipeline can be programmable, thereby providing flexibility for creating graphics for a variety of applications. The first stage is input assembly stage 102 where primitive data such as points, lines, and triangles is read from user-provided buffers. The data is assembled into primitives, which are used in other stages in the pipeline 100. Vertices can be assembled into different primitive types. This data is then provided to a vertex-shader stage 104 where vertices are processed. Vertices are processed by performing operations such as transformations, skinning, and lighting. In vertex-shader stage 104, operations are performed for each vertex and a corresponding output vertex is produced for each vertex. In geometry-shader stage 106, entire primitives are processed. The input includes a fall primitive, which is three vertices for a triangle, two vertices for a line, or a single vertex for a point. Each primitive can also include vertex data for any edge-adjacent primitives.

In stream-output stage 108 primitive data is streamed from the pipeline 100 to memory on its way to a rasterizer. Data can be streamed out to the rasterizer. Data streamed out to memory can be provided back into the pipeline as input data or read-back from a CPU. The rasterizer stage 110 is responsible for clipping primitives, preparing primitives for a pixel shader, and determining how to invoke pixel shaders. The pixel-shader stage 112 receives interpolated data for a primitive and generates per-pixel data such as color. The output-merger stage 114 combines various types of output data such as pixel shader values, depth and stencil information with the contents of the render target, and depth/stencil buffers to generate the final pipeline result.

Figure 2:
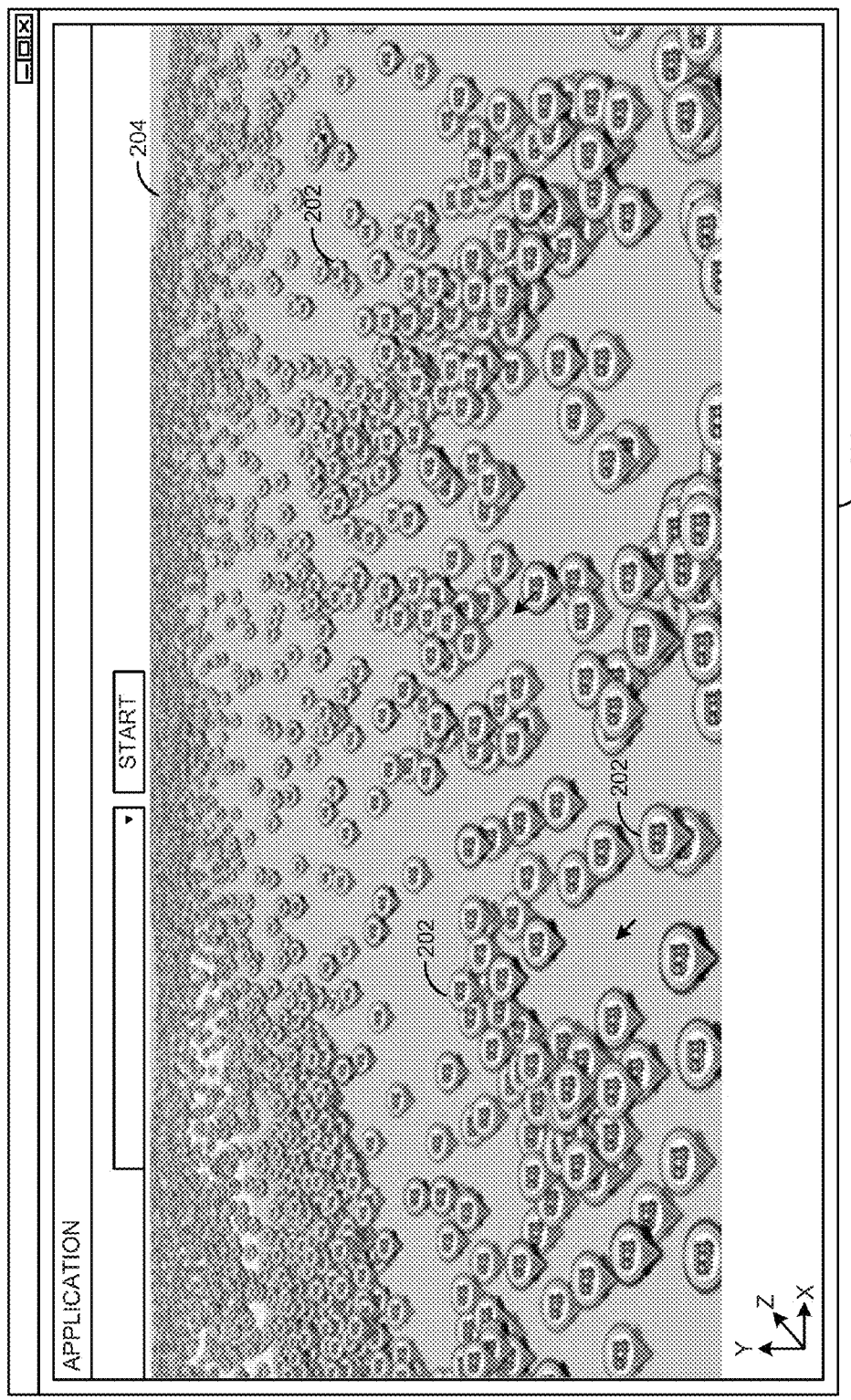
FIG. 2 is a block diagram of a user interface including a plurality of visual objects, according to one embodiment.

In several interactive applications, a user selects one or more visual objects that are displayed on a screen. A user can select a desired visual object using a mouse. In case of touch-screen displays, a desired visual object can be selected by touching it on the screen. Visual objects are selected for various purposes depending on the type of application. In some applications, a very large number of visual objects need to be displayed on a user interface. These visual objects can have same geometry. FIG. 2 illustrates one such user interface 200 that includes a large number of visual objects. In this example, the visual objects are pins 202. These pins 202 can be presented on a map 204 or any topography. The pins 202 have same geometry but are of different sizes to provide a three-dimensional effect. For example, a pin's location is captured in three-dimensions, namely, an X-dimension, a Y-dimension, and a Z-dimension. A pin having higher value of Z-dimensional coordinate can have reduced size compared to a pin having lower value of Z-dimensional coordinate to portray the three-dimensional effect. Each pin 202 is associated with a location in the map 204. A user can select a pin 202 to know more details about data associated with a location corresponding to that pin 202.

Figure 3:
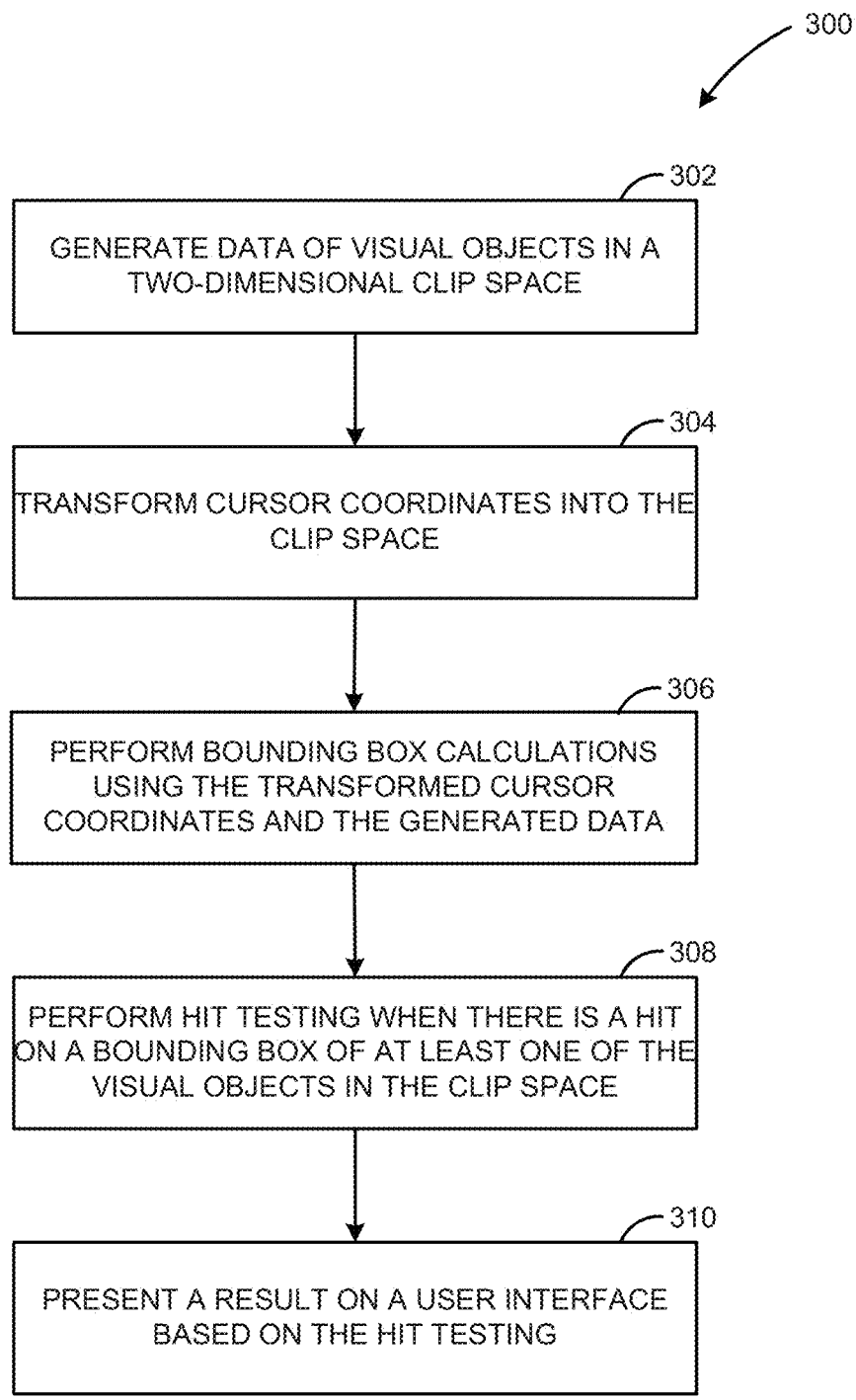
FIG. 3 is a block diagram of an embodiment of hit testing method.
Figure 4:
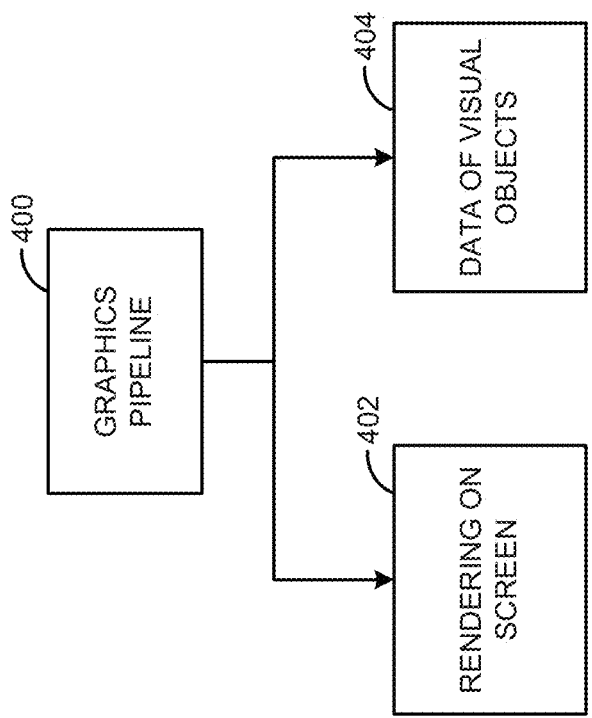
FIG. 4 is a block diagram illustrating output of a graphics pipeline, according to one embodiment.

FIG. 3 illustrates an embodiment of hit testing method 300. At 302, data of visual objects is generated in a two-dimensional clip space. This data is generated during the process of rendering, i.e., via a graphics pipeline. Referring to FIG. 4, the graphics pipeline 400 is processed in a Graphics Processing Unit (GPU). The GPU renders the visual objects 402 on a screen. The GPU also generates and provides data of visual objects 404 in the two-dimensional clip space as an output. The data of visual objects 404 includes two-dimensional projections of visual objects. Since the visual objects are in three-dimensions, the visual objects are projected into two-dimensions in the clip space. Therefore, for each three-dimensional visual object rendered on a screen, a corresponding two-dimensional projection is present in the clip space. In one embodiment, matrix-based projection transformations can be used to generate data of visual objects in the clip space.

Figure 5:
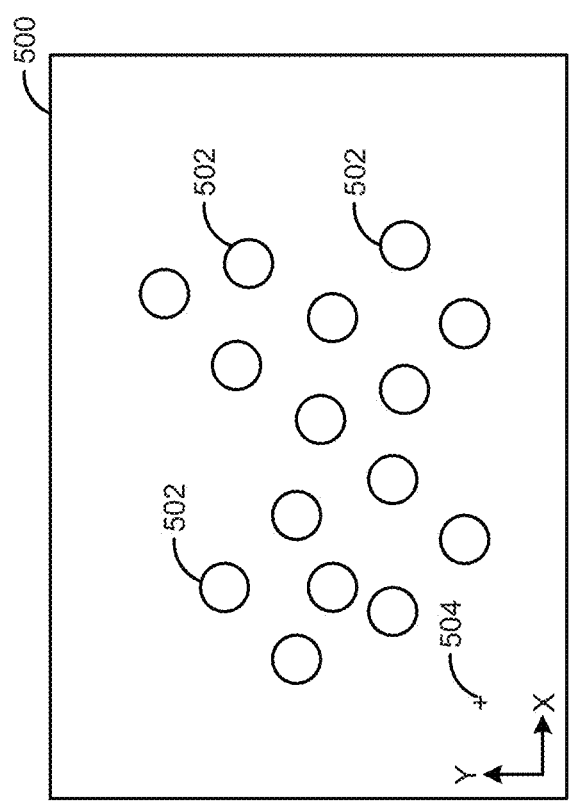
FIG. 5 is a block diagram illustrating projected visual objects in a clip space, according to one embodiment.

FIG. 5 graphically depicts a clip space 500 and data of visual objects 502 in the clip space 500, as an example. The clip space 500 is in two-dimensions, namely, an X-dimension and a Y-dimension. Three-dimensional data of a visual object is projected into two-dimensions of the clip space 500. In one embodiment, the two-dimensional projections capture position data of the visual objects. A visual object is characterized by a plurality of vertices. Simple visual objects such as pins can have up to four or five vertices. A vertex includes attributes such as position, color, and texture coordinates. Depending on the visual objects and the type of the graphics rendering platform, the attributes of vertices vary and can also be defined. In one embodiment, the vertices of the visual objects are projected into two-dimensions of the clip space. Therefore, data of a visual object 502 in the clip space 500 includes transformed two-dimensional coordinates of vertices of that visual object. These two-dimensional coordinates therefore indicate the location of the visual objects.

In one embodiment, if the visual objects have complex structure and include larger number of vertices (e.g., greater than five vertices), then the number of vertices of the objects are reduced before generating data of visual objects. As an example, vertex data can be grouped or batched together to reduce the number of vertices. In one embodiment, when the visual objects have a large number of vertices, an additional step can be performed to obtain three-dimensional bounding boxes. These three-dimensional bounding boxes will have reduced number of vertices compared to the vertices of the visual objects. This additional step generates a stream output to the CPU.

Referring back to FIG. 3, at 304, cursor coordinates are transformed into the clip space. The cursor coordinates are obtained from user actions on the user interface (as shown in FIG. 2). The user actions include selection of a visual object by using a mouse or by touching the visual object in case of touchscreen devices. The coordinates of the cursor indicate location of the cursor with respect to the screen space. This transformation is a normalizing transformation of the cursor coordinates. The transformed cursor coordinates 504 is a point defined by X and Y coordinates in the clip space 500, as shown in FIG. 5.

Figure 6:
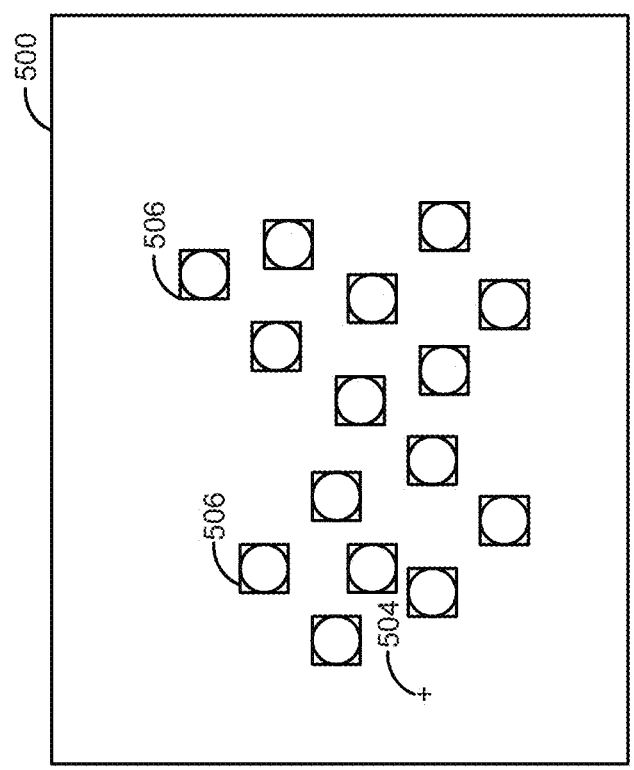
FIG. 6 is a block diagram illustrating bounding box calculations in the clip space, according to one embodiment.

Referring back to FIG. 3, at 306, bounding box calculations are performed using the transformed cursor coordinates and the data of the visual object in the clip space. First, minimum bounding boxes are calculated for the visual objects. A minimum bounding box can be a smallest rectangle or any polygon that encloses a visual object. In one embodiment, a minimum bounding box is a smallest rectangle that encloses the transformed vertices (in the clip space) of a particular visual object. FIG. 6 graphically illustrates bounding boxes for the transformed vertices of the visual objects in the clip space 500. The transformed cursor coordinates 504 and the calculated bounding boxes 506 are then used to determine if there is hit by the cursor on any of the bounding boxes 506. The transformed cursor coordinates 504 represent a point in the clip space. If this point is within a bounding box, then it is considered that there is a hit on that bounding box. In one embodiment, a bounding box algorithm performs bounding box calculations. A bounding box algorithm checks whether a point lies within a bounding box, which can be a rectangle.

In some cases, the visual objects 502 in the clip space may overlap, indicating that they are at different depth or Z-dimension. The cursor coordinates may have a hit on more than one of these overlapping objects. Therefore, in one embodiment, the bounding boxes 506 can have a z-dimensional value, which can be used to detect a visual object among the overlapping visual objects.

Figure 7:
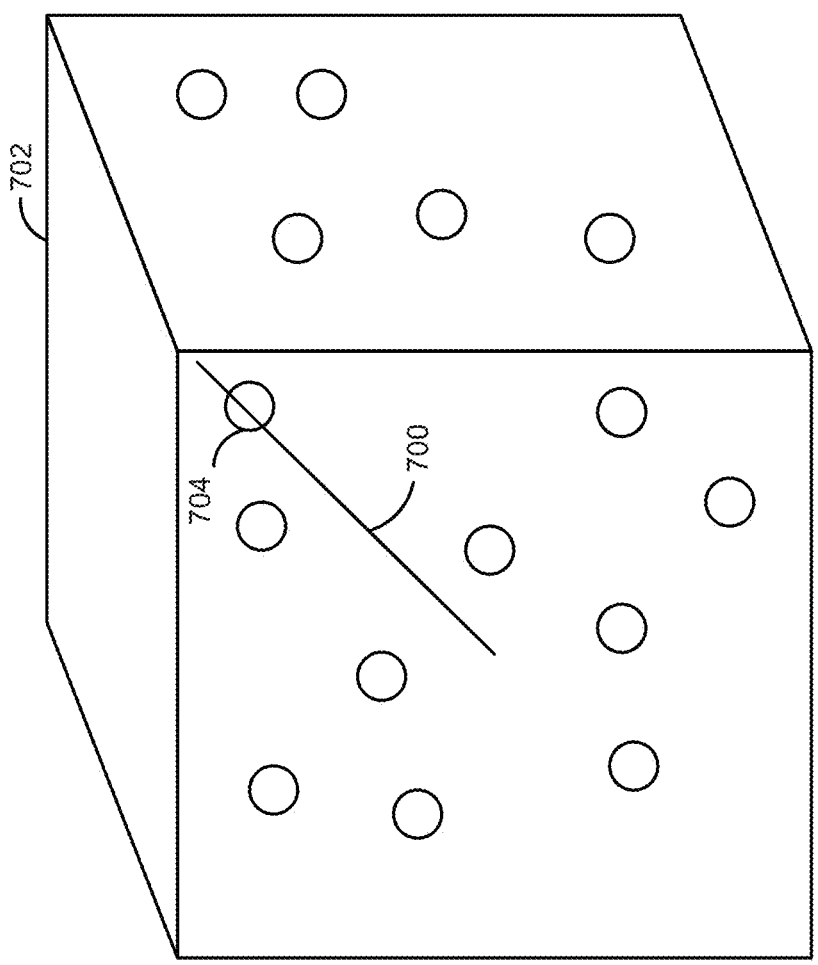
FIG. 7 is a block diagram illustrating hit testing calculations in a three-dimensional space, according to one embodiment.

Referring back to FIG. 3, at 308, hit testing is performed when there is a hit on a bounding box of a visual object in the clip space. For example, if there is a hit on a bounding box of a visual object 'X' in the clip space, then hit testing is performed to determine whether the user selected the visual object 'X' in the screen space. The space where hit testing is performed is a three-dimensional space, as shown in FIG. 7. The visual objects are represented in three-dimensions in this three-dimensional space corresponding to their arrangement in the UI screen space (e.g., FIG. 2). Specifically, the vertices and location information of the visual objects are represented in three-dimensions.

If there is a hit on a bounding box of a visual object 'X' in the clip space, then hit testing is performed for the visual object 'X' in the three-dimensional space. In one embodiment, a picking algorithm is used for hit testing. Referring to FIG. 7, the picking algorithm converts cursor position in the screen space into three dimensions and creates a line 700 in the three-dimensional space 702 using the view direction. If the created line 700 intersects a visual object 'X' 704, then there is a hit on that visual object 704. This indicates that the user had selected the visual object 'X' 704 in the screen space.

In one embodiment, the visual objects in the three-dimensional space are divided into triangles and the picking algorithm performs hit testing based on these triangles. The picking algorithm processes the triangles to determine if the line 700 intersects a triangle. When the line 700 intersects a triangle, then it is determined that there is a hit on the corresponding visual object.

Figure 8:
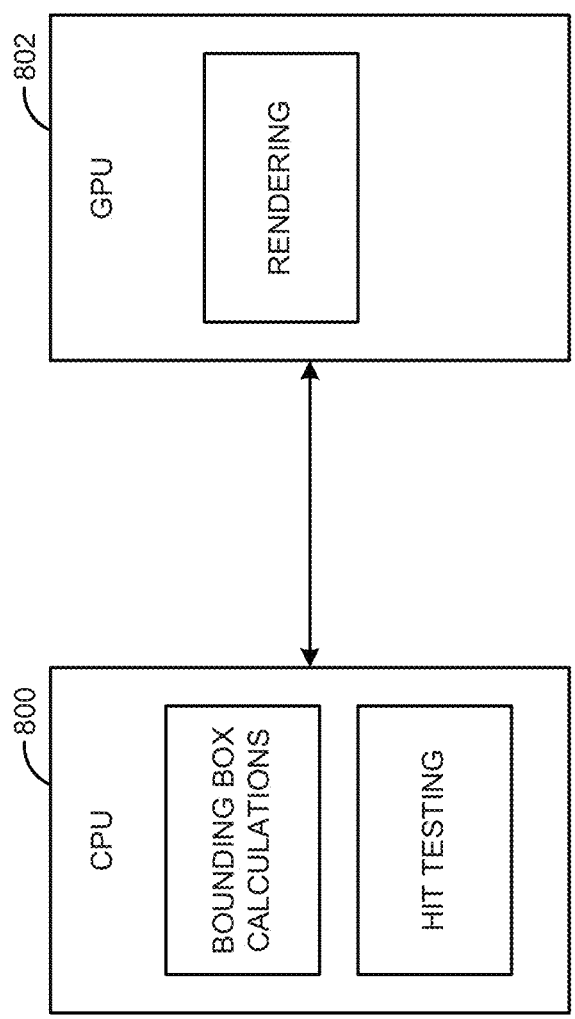
FIG. 8 is a block diagram illustrating operations performed by a central processing unit and a graphics processing unit, according to one embodiment.

In typical hit testing techniques, several matrix transformations are performed depending on the number of visual objects. Matrix transformations include operations such as scaling, translation, rotation, projections, etc. Also, both bounding box calculations and picking calculations are performed by the CPU in the three-dimensional space. Significant CPU resources are consumed if there are numerous visual objects (as in the example shown in FIG. 2). Referring to FIG. 8, the CPU 800 performs bounding box calculations and picking calculations and the GPU 802 performs rendering. The CPU and GPU are in communication during the rendering and hit testing process. By performing bounding box calculation in clip space and then performing picking calculations on one or more visual objects that have a hit on their bounding box, the number of matrix transformations required for picking calculations is drastically reduced. Instead of applying matrix transformations for all the visual objects for the hit testing and bounding box calculations, the CPU applies matrix transformations only to those visual objects that have a hit on their bounding box in the clip space. The reduction in number of matrix transformations reduces load on the CPU and improves overall performance of the CPU.

Figure 9:
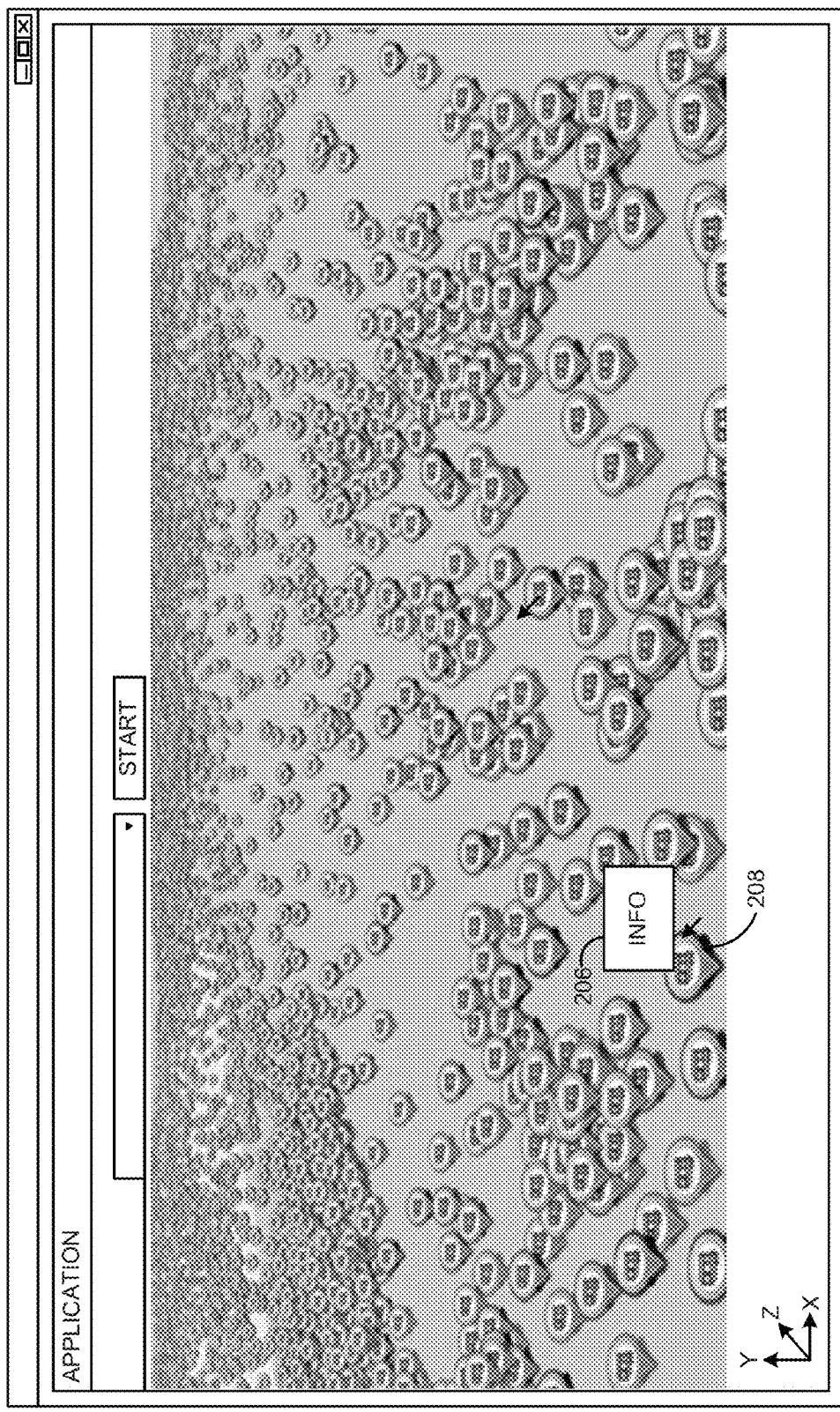
FIG. 9 is a block diagram of a user interface showing a result following a selection of a visual object, according to one embodiment.

Referring to FIG. 9, if a visual object such as a pin is determined to be selected based on the hit testing calculations, a result is displayed on the user interface 200. This result 206 is associated with the selected pin 208. The type of result 206 displayed varies depending on the application. As an example, the result 206 can include information associated with the selected pin 208. As another example, the result 206 can include a change in graphical properties of the selected pin 208.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
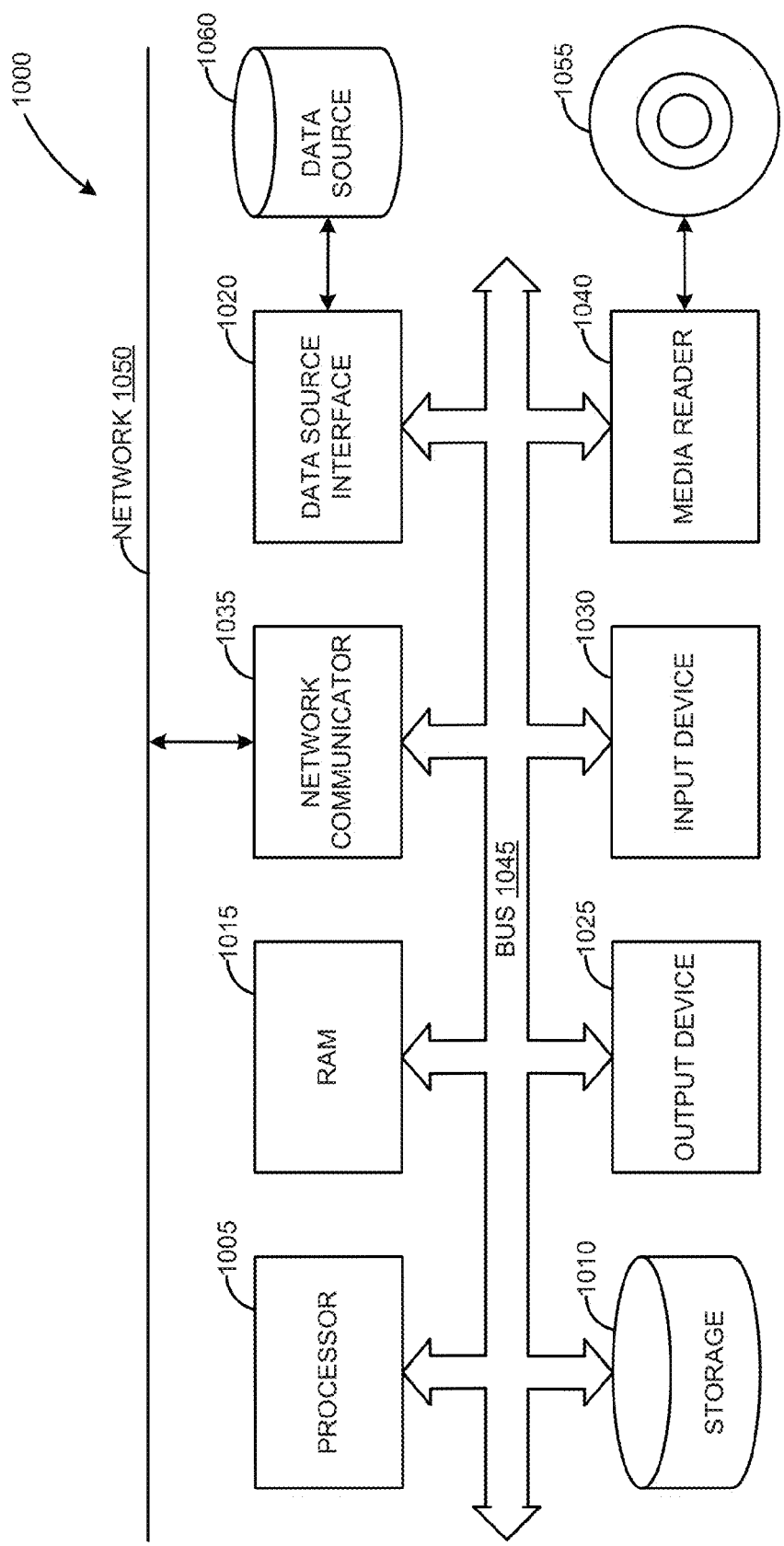
FIG. 10 is a block diagram of an exemplary computer system according to one embodiment.

FIG. 10 is a block diagram of an exemplary computer system 1000. The computer system 1000 includes a processor 1005 that executes software instructions or code stored on a computer readable storage medium 1055 to perform the above-illustrated methods of the invention. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   render visual objects in three dimensions on a screen space of a user interface;
   generate data for the visual objects in a two-dimensional clip space, wherein the data includes transformed two-dimensional coordinates indicating locations of the visual objects corresponding to the rendered visual objects;
   obtain cursor coordinates from a user interaction with the screen space indicating a location of a cursor;
   transform the cursor coordinates into the two-dimensional clip space;
   perform bounding box calculations in the clip space using the transformed cursor coordinates and the generated data, wherein the bounding box calculations comprise a calculation of a minimum bounding box that encloses a visual object from the visual objects projected in the two-dimensional clip space;
   determine whether there is a hit of the transformed cursor coordinates on at least one minimum bounding box of at least one of the visual objects in the two-dimensional clip space;
   perform hit testing when there is a hit on at least one minimum bounding box of at least one of the visual objects in the two-dimensional clip space, wherein the hit testing is performed in a three-dimensional space and comprises:
      representing a visual object with three dimensions in the three-dimensional space correspondingly to the rendering on the screen space;
      converting the location of the cursor from the screen space in three dimensions in the three-dimensional space;
      defining a three-dimensional bounding box in the three-dimensional space for the visual object by including a third dimension to a minimum bounding box for the visual object defined in the two-dimensional clip space;
      creating a line in the three-dimensional space based on the converted location of the cursor and a view direction of the three-dimensional space; and
      determining a hit on the visual object when the line intersects the three-dimensional bounding box of the visual object in the three-dimensional space; and
   present a result on a user interface based on the hit testing.

2. The article of manufacture of claim 1, further comprising instructions which when executed by the computer further causes the computer to:
   reducing the number of vertices of the visual objects before generating the data.

3. The article of manufacture of claim 1, wherein the projections of the visual objects are two-dimensional projections based on three-dimensional data of the visual objects.

4. The article of manufacture of claim 1, wherein a central processing unit performs the bounding box calculations and the hit testing and a graphics processing unit (GPU) renders the visual objects on the user interface and generates the data of the visual objects in the two-dimensional clip space.

5. The article of manufacture of claim 1, wherein the visual objects have same geometry.

6. The article of manufacture of claim 1, wherein the projected visual objects include up to five vertices.

7. A computer-implemented method for hit testing, the method comprising:
   rendering visual objects in three dimensions on a screen space of a user interface;
   generating data for the visual objects in a two-dimensional clip space by a graphics processing unit (GPU), wherein the data includes transformed two-dimensional coordinates indicating locations of the visual objects corresponding to the rendered visual objects;
   obtaining cursor coordinates from a user interaction with the screen space indicating a location of a cursor;
   transforming the cursor coordinates into the two-dimensional clip space;
   performing bounding box calculations in the clip space using the transformed cursor coordinates and the generated data, wherein the bounding box calculations comprise a calculation of a minimum bounding box that encloses a visual object from the visual objects projected in the two-dimensional clip space;
   determining whether there is a hit of the transformed cursor coordinates on at least one minimum bounding box of at least one of the visual objects in the two-dimensional clip space;
   performing hit testing when there is a hit on at least one minimum bounding box of at least one of the visual objects in the two-dimensional clip space, wherein the hit testing is performed by a central processing unit in a three-dimensional space and comprises:
      representing a visual object with three dimensions in the three-dimensional space correspondingly to the rendering on the screen space;
      converting the location of the cursor from the screen space in three dimensions in the three-dimensional space;
      defining a three-dimensional bounding box in the three-dimensional space for the visual object by including a third dimension to a minimum bounding box for the visual object defined in the two-dimensional clip space;
      creating a line in the three-dimensional space based on the converted location of the cursor and a view direction of the three-dimensional space; and
      determining a hit on the visual object when the line intersects the three-dimensional bounding box of the visual object in the three-dimensional space; and
   presenting a result on a user interface based on the hit testing.

8. The method of claim 7, further comprising reducing the number of vertices of the visual objects before generating the data.

9. The method of claim 7, wherein the projections of the visual objects are two-dimensional projections based on three-dimensional data of the visual objects.

10. The method of claim 7, wherein the central processing unit performs the bounding box calculations and the graphics processing unit (GPU) renders the visual objects on the user interface.

11. The method of claim 7, wherein the visual objects have same geometry.

12. The method of claim 7, wherein the projected visual objects include up to five vertices.

13. A computer system for hit testing, comprising:
   a computer memory to store program code; and
   a processor to execute the program code to:
      render visual objects in three dimensions on a screen space of a user interface;
      generate data for the visual objects in a two-dimensional clip space, wherein the data includes transformed two-dimensional coordinates indicating locations of the visual objects corresponding to the rendered visual objects;
      obtain cursor coordinates from a user interaction with the screen space indicating a location of a cursor;
      transform the cursor coordinates into the two-dimensional clip space;
      perform bounding box calculations in the clip space using the transformed cursor coordinates and the generated data, wherein the bounding box calculations comprise a calculation of a minimum bounding box that encloses a visual object from the visual objects projected in the two-dimensional clip space;
      determine whether there is a hit of the transformed cursor coordinates on at least one minimum bounding box of at least one of the visual objects in the two-dimensional clip space;
      perform hit testing when there is a hit on at least one minimum bounding box of at least one of the visual objects in the two-dimensional clip space, wherein the hit testing is performed in a three-dimensional space and comprises:
         representing a visual object with three dimensions in the three-dimensional space correspondingly to the rendering on the screen space;
         converting the location of the cursor from the screen space in three dimensions in the three-dimensional space;
         defining a three-dimensional bounding box in the three-dimensional space for the visual object by including a third dimension to a minimum bounding box for the visual object defined in the two-dimensional clip space;
         creating a line in the three-dimensional space based on the converted location of the cursor and a view direction of the three-dimensional space; and
         determining a hit on the visual object when the line intersects the three-dimensional bounding box of the visual object in the three-dimensional space; and
      present a result on a user interface based on the hit testing.

14. The system of claim 13, wherein the processor further executes the program code to:
   reduce the number of vertices of the visual objects before generating the data.

15. The system of claim 13, wherein the projections of the visual objects are two-dimensional projections based on three-dimensional data of the visual objects.

16. The system of claim 13, wherein a central processing unit performs the bounding box calculations and the hit testing and a graphics processing unit (GPU) renders the visual objects on the user interface and generates the data of the visual objects in the two-dimensional clip space.

17. The system of claim 13, wherein the visual objects have same geometry.

* * * * *